United States Patent
Handa

(10) Patent No.: US 8,847,345 B2
(45) Date of Patent: Sep. 30, 2014

(54) OPTICAL ELEMENT, IMAGE SENSOR INCLUDING THE OPTICAL ELEMENT, AND IMAGE PICKUP APPARATUS INCLUDING THE IMAGE SENSOR

(75) Inventor: Yoichiro Handa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 13/057,296

(22) PCT Filed: Dec. 16, 2009

(86) PCT No.: PCT/JP2009/006913
§ 371 (c)(1),
(2), (4) Date: Feb. 3, 2011

(87) PCT Pub. No.: WO2010/073543
PCT Pub. Date: Jul. 1, 2010

(65) Prior Publication Data
US 2011/0128405 A1  Jun. 2, 2011

(30) Foreign Application Priority Data

Dec. 26, 2008  (JP) ................................ 2008-333868

(51) Int. Cl.
| | |
|---|---|
| H01L 27/146 | (2006.01) |
| H01L 27/14 | (2006.01) |
| H01L 31/062 | (2012.01) |
| H01L 31/113 | (2006.01) |
| H01L 27/00 | (2006.01) |
| G01J 3/50 | (2006.01) |
| H01J 5/16 | (2006.01) |
| H04N 9/083 | (2006.01) |
| H04N 3/14 | (2006.01) |
| H04N 5/335 | (2011.01) |
| H04N 9/04 | (2006.01) |
| G02B 26/00 | (2006.01) |
| G02F 1/00 | (2006.01) |
| G02F 1/03 | (2006.01) |
| G02F 1/07 | (2006.01) |
| G02B 5/20 | (2006.01) |
| B82Y 20/00 | (2011.01) |
| G02B 5/00 | (2006.01) |

(52) U.S. Cl.
CPC ................. G02B 5/204 (2013.01); B82Y 20/00 (2013.01); G02B 5/008 (2013.01)
USPC ........ 257/435; 250/208.1; 250/226; 257/292; 257/294; 257/431; 348/273; 348/294; 359/237; 359/245

(58) Field of Classification Search
USPC ........................ 250/208.1, 226; 359/237–241, 359/244–279, 359–360; 348/266–324; 356/445; 257/292, 294, 414, 428, 431, 257/435
See application file for complete search history.

(56) References Cited

U.S. PATENT DOCUMENTS 5,973,316 A  10/1999  Ebbesen et al.
7,859,672 B2  12/2010  Yamada et al.
(Continued)

FOREIGN PATENT DOCUMENTS

WO  2007/118895 A1  10/2007
WO  2008/014983 A1  2/2008
(Continued)

OTHER PUBLICATIONS

Nov. 5, 2012 Chinese Official Action in Chinese Patent Appln. No. 200980151440.4.
(Continued)

*Primary Examiner* — Michael Osinski
(74) *Attorney, Agent, or Firm* — Fitzpatrick, Cella, Harper & Scinto

(57) ABSTRACT

An optical element includes a plurality of optical filters having different characteristics. The element includes a first optical filter including a first metal-structure group including first metal structures periodically arranged in an in-plane direction of a substrate surface and a second optical filter including a second metal-structure group including second metal structures periodically arranged in the in-plane direction, the second metal-structure group exhibiting a plasmon resonance condition different from that of the first metal-structure group. The optical distance between the first metal structures adjacent to each other is in a range of 0.75 to 1.25 times the optical distance between the second metal structures adjacent to each other.

9 Claims, 19 Drawing Sheets

(56) References Cited

U.S. PATENT DOCUMENTS

| | | | |
|---|---|---|---|
| 8,148,762 B2* | 4/2012 | Joe et al. | 257/294 |
| 8,314,935 B2* | 11/2012 | Handa et al. | 356/445 |
| 2003/0132392 A1* | 7/2003 | Kuroda et al. | 250/397 |
| 2006/0262398 A1* | 11/2006 | Sangu et al. | 359/486 |
| 2006/0273245 A1* | 12/2006 | Kim et al. | 250/226 |
| 2006/0279738 A1* | 12/2006 | Ogawa et al. | 356/445 |
| 2007/0008602 A1* | 1/2007 | Ballato et al. | 359/245 |
| 2007/0103782 A1* | 5/2007 | Lee et al. | 359/565 |
| 2009/0008735 A1* | 1/2009 | Ogino et al. | 257/436 |
| 2009/0117669 A1* | 5/2009 | Yamamichi et al. | 436/525 |
| 2009/0323060 A1* | 12/2009 | Knipp | 356/327 |
| 2010/0046077 A1 | 2/2010 | Lee et al. | |
| 2010/0059663 A1 | 3/2010 | Desieres | |
| 2010/0220377 A1 | 9/2010 | Yamada et al. | |
| 2010/0295143 A1* | 11/2010 | Yokogawa | 257/435 |
| 2010/0309539 A1* | 12/2010 | Kaye et al. | 359/288 |
| 2011/0164252 A1* | 7/2011 | Handa et al. | 356/445 |
| 2012/0292521 A1* | 11/2012 | Yokogawa | 250/372 |

FOREIGN PATENT DOCUMENTS

| | | |
|---|---|---|
| WO | 2008/082569 A1 | 7/2008 |
| WO | 2009/011439 A1 | 1/2009 |

OTHER PUBLICATIONS

Eric Laux, et al., "Plasmonic photon sorters for spectral and polarimetric imaging", Nature Photonics, vol. 2, Mar. 2008, pp. 161-164.

C. Genet, et al., "Light in tiny holes", Nature, Nature Publishing Group, London, GB, vol. 445, Jan. 4, 2007, pp. 39-46.

Domenico Pacifici, et al., "Universal optical transmission features in periodic and quasiperiodic hole arrays", Optics Express, vol. 16, No. 12, Jun. 9, 2008, pp. 9222-9238.

May 10, 2010 International Search Report and Written Opinion in PCT/JP2009/006913.

* cited by examiner

OPTICAL ELEMENT, IMAGE SENSOR INCLUDING THE OPTICAL ELEMENT, AND IMAGE PICKUP APPARATUS INCLUDING THE IMAGE SENSOR

TECHNICAL FIELD

The present invention relates to an optical element that uses a plasmon resonance phenomenon.

BACKGROUND ART

Color filters for imaging devices used heretofore have generally made use of absorption properties of colorants. However, such color filters using colorants must be thick to achieve sufficient absorption, and colors of the colorants fade with the passage of time.

On the other hand, pixels of imaging devices, such as charge coupling devices (CCDs) and complementary metal-oxide semiconductor (CMOS) image sensors, are becoming smaller with the increase in the number of pixels. In such a case, since the amount of light captured by detector units of image sensors decreases, the thickness of microlenses, color filters, wirings, etc., is desirably small to capture a sufficient amount of light. Moreover, since image sensors also capture obliquely incident light, color-filter characteristics that do not significantly vary with respect to the obliquely incident light are desired.

Under such circumstances, color filters that use a plasmon resonance phenomenon are being studied. Plasmon is collective oscillation of free electrons confined to metal surfaces and excited by external electrical fields, such as light. Since electrons are charged, oscillation of electrons results in polarization caused by a density distribution of free electrons. The coupling of such polarization to electromagnetic fields is called "plasmon resonance". When light is incident on metal particles or metal structures, a resonance phenomenon is observed in which scattering or absorption increases in a particular wavelength band. This phenomenon is the localized surface plasmon resonance (simply referred to as "plasmon resonance" hereinafter) and the wavelength at which the absorption spectrum shows the maximum peak is referred to as a "plasmon resonance wavelength".

As light is transmitted through metal particles or metal structures, the transmittance decreases in a wavelength band in which plasmon resonance occurs and selective transmission of light occurs, depending on the wavelength. Thus, this can be used to form color filters. Since a plasmon resonance phenomenon also occurs on thin metal structures, it possibly contributes to the thickness reduction of image sensors.

U.S. Pat. No. 5,973,316 discloses an array formed by periodically arranging apertures smaller than the wavelength of the incident light in a metal thin film. The period of the apertures and the size of the apertures are matched with excited plasmon to increase the transmittance in a particular wavelength band.

Nature Photonics (2008) 2, 161-164 teaches a structure including a periodic structure constituted by concentric grooves formed in a silver film and having an aperture at the center of the concentric circles and describes that this structure exhibits color-filter characteristics according to which the intensities of red, green, and blue transmitted light increase.

According to the aperture array disclosed in U.S. Pat. No. 5,973,316, the percentage of the metal that serves as a light-blocking portion with respect to the apertures is large and thus, the transmittance is only about 5% to 6% at most. The aperture array, thus, does not have a sensitivity sufficient for color-filter application.

According to the color filter incorporating the periodic structure in the silver film disclosed in Nature Photonics (2008) 2, 161-164, light is transmitted through the aperture at the center of the concentric grooves and thus a sufficient transmittance cannot be expected under current technologies. Moreover, in such a case, the color-filter characteristic requires a large region sufficient for ensuring periodicity of the metal structure. Thus, since the metal structure must be placed within a pixel and the size of one pixel is increasingly becoming smaller, a sufficient periodicity of the metal structure may not be ensured and the color-filter characteristic may deteriorate. Moreover, this literature does not focus on improving the overall characteristics of optical elements including a plurality of color filters having different characteristics.

CITATION LIST

Patent Literature

[PTL 1]
U.S. Pat. No. 5,973,316

Non Patent Literature

[NPL 1]
Nature Photonics (2008) 2, 161-164

SUMMARY OF INVENTION

The present invention provides an optical element that exhibits sufficient color-filter characteristics even when the size of pixels becomes smaller and can function as a thin color filter.

One aspect of the present invention provides an optical element including a plurality of optical filters having different characteristics. The optical element includes a first optical filter including a first metal-structure group including first metal structures periodically arranged in an in-plane direction of a substrate surface and a second optical filter including a second metal-structure group including second metal structures periodically arranged in the in-plane direction, the second metal-structure group exhibiting a plasmon resonance condition different from that of the first metal-structure group. The optical distance between the first metal structures adjacent to each other is in a range of 0.75 to 1.25 times the optical distance between the second metal structures adjacent to each other.

Other aspects of the present invention include an image sensor and an image pickup apparatus. An aspect of the present invention provides an image sensor configured to detect light according to spectrum characteristics, the image sensor including an optical element configured to selectively transmit light on a wavelength basis and a photoelectric conversion layer which light that has been transmitted through the optical element enters. The optical element described above is used as the optical element of the image sensor.

Another aspect of the present invention provides an image pickup apparatus configured to obtain image information, the image pickup apparatus including a condenser optical system, an image sensor, and a signal processing device. The image sensor described above is used as the image sensor of the image pickup apparatus.

Since the optical distances between the metal structures of the metal-structure groups respectively constituting the plurality of optical filters having different characteristics are made substantially uniform, transmission spectra have smooth profiles and relatively sharp peak characteristics. Accordingly, an optical element that shows a high-contrast filtering effect for a particular wavelength region can be provided.

Moreover, the optical element of the present invention uses a plasmon resonance phenomenon and thin metal structures can be used to form the optical element. Thus, thin color filters, image sensors, image pickup apparatuses, and the like that are compatible with size reduction of pixels can be provided.

DESCRIPTION OF EMBODIMENTS

The embodiments of the present invention will now be described. The issues investigated in making an optical element of the present invention are described first.

Figure 1:
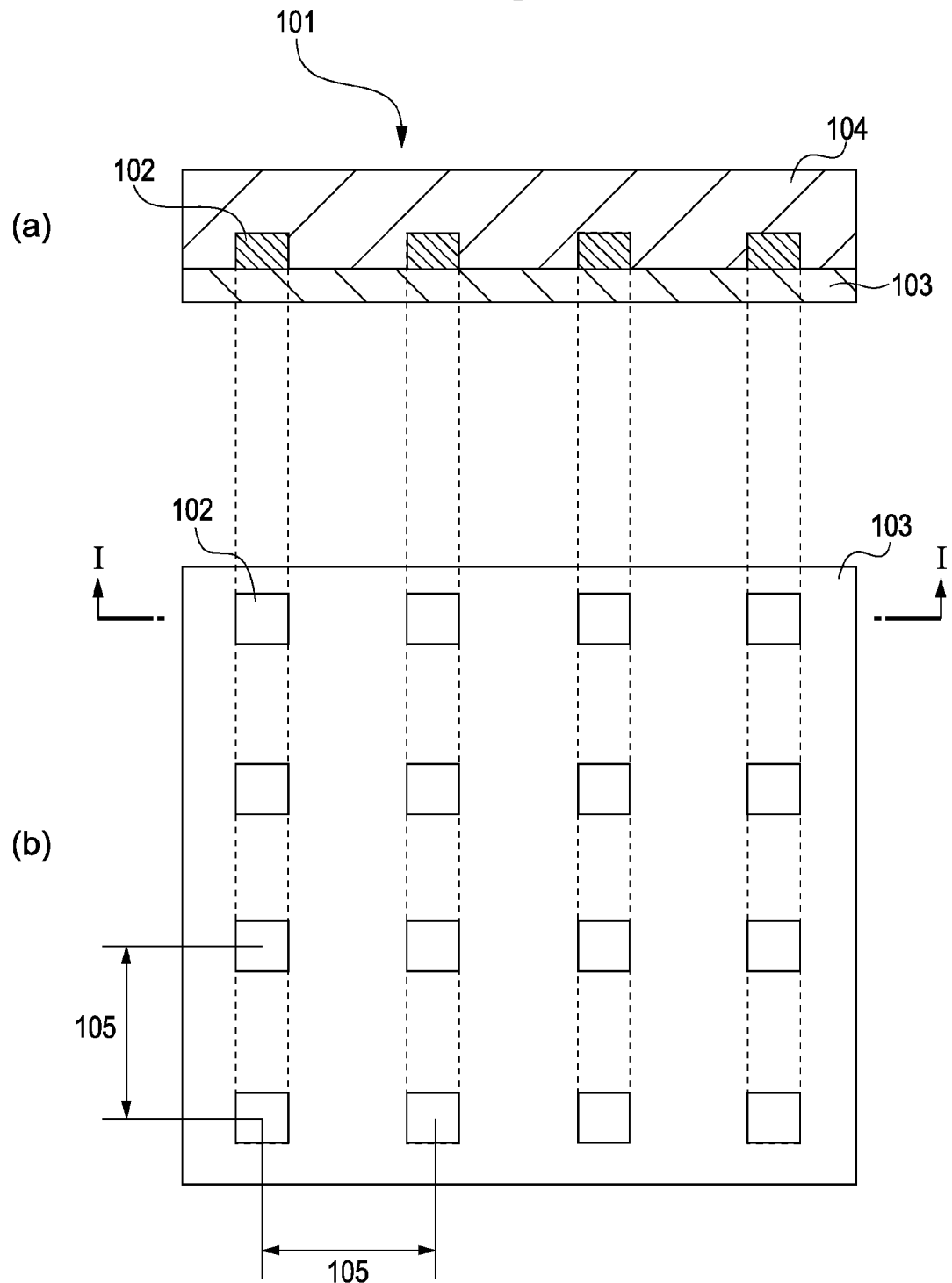
FIGS. 1(a) and 1(b) are schematic views showing the structure of an optical filter of the present invention.

FIGS. 1(a) and 1(b) are schematic views showing the structure of an optical filter that can be used in an optical element of the present invention. FIG. 1 (a) is a cross-sectional view of an optical filter 101 taken along line I-I in FIG. 1 (b) and FIG. 1(b) is a top view of the optical filter 101.

Metal structures 102 of the optical filter 101 shown in FIG. 1 are arranged into a square grid while being equally spaced from each other by an optical distance 105 in the in-plane direction of the surface of a substrate 103. The metal structures 102 are covered with a cover layer 104.

First, the optical distance of a metal-structure group according to the present invention is described.

Metal structures of the present invention are arranged two-dimensionally and periodically in the in-plane direction of the substrate surface. In the present invention, the "optical distance of a metal-structure group" refers to the product of the distance between the center of any one of the metal structures periodically arranged and the center of an adjacent metal structure and the refractive index of the surrounding material for the wavelength of the light used. In other words, the optical distance is the product of the distance (period) between adjacent metal structures and the refractive index of the medium that lies between the metal structures.

The refractive index n of the medium is represented by formula (I) below, where c is the velocity of light in vacuum and v is the velocity of light passing through the medium.

$$n = c/v \qquad \text{(Formula I)}$$

In other words, suppose that light travels a distance d in a medium having a refractive index n, n×d is the optical distance and d corresponds to the period of arranging the metal structures in the description of the present invention.

That is, in the present invention, the overall characteristic of the optical element including a plurality of optical filters having different characteristics is improved by taking into account the refractive index of the medium (substrate, cover layer, etc.) surrounding the metal structures.

Since the pattern of arranging the metal structures is not limited to one, the meaning of the phrase "the optical distance is equal" or phrases similar thereto in the present invention is that the metal structures are equally spaced from each other in the in-plane direction of the substrate surface when the medium (dielectric material or the like) that lies between adjacent metal structures is considered.

When two or more metal-structure groups are provided and the medium that lies between the metal structures is the same among the groups, the period at which the metal structures are arranged corresponds to the optical distance.

Figure 2:
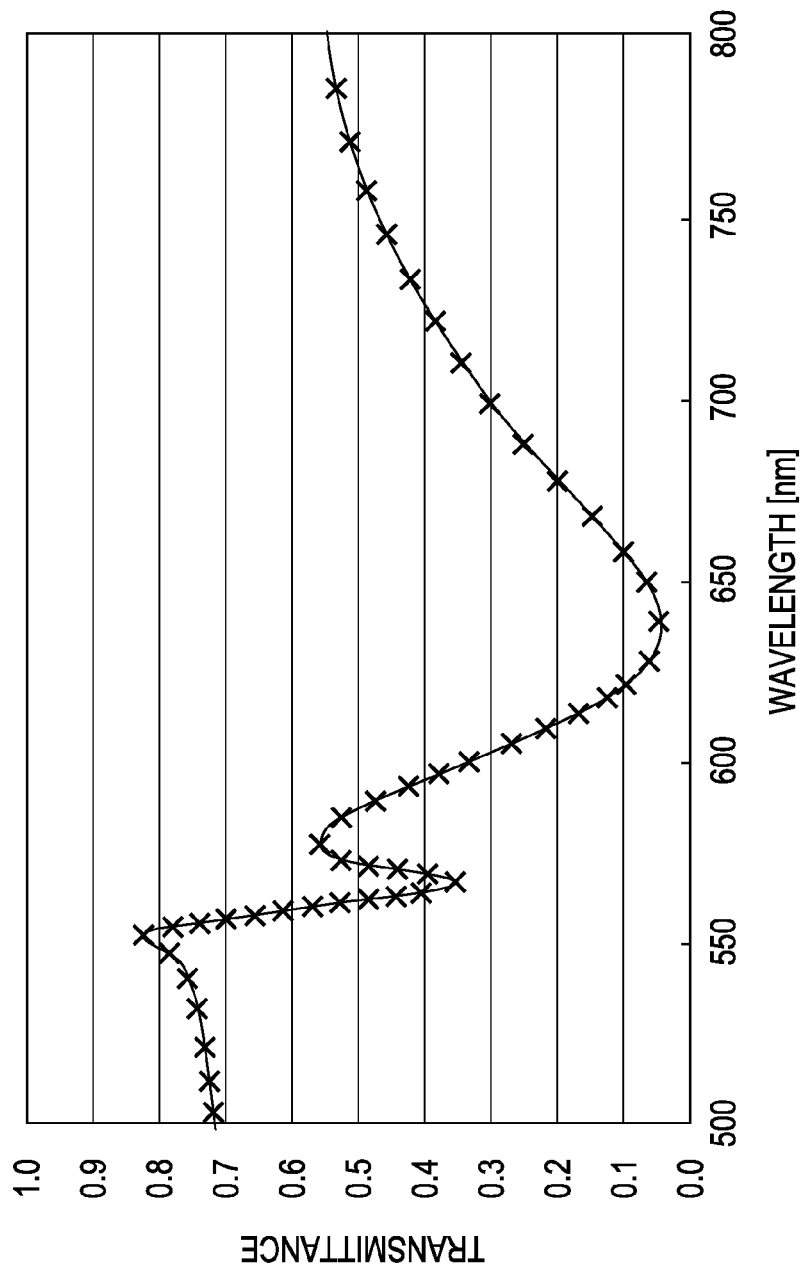
FIG. 2 is a graph showing one example of a transmission spectrum of the optical filter.

FIG. 2 is a graph showing the results of numerical calculation on a transmission spectrum of the optical filter 101. For the purpose of the calculation, it is assumed that the metal structures 102 are composed of aluminum and arranged infinitely on the substrate 103.

The transmission spectrum shown in FIG. 2 shows a change in transmittance near a wavelength of 550 nm but the transmittance smoothly decreases toward a center wavelength of about 640 nm. If this decrease in transmittance can be used in forming a color filter, a transmission-type complementary color filter or a reflection-type primary color filter can be formed.

Next, the transmission spectrum (numerical calculation) of an optical element including three types of optical filters having different characteristics and being arranged into a Bayer pattern is described with reference to FIGS. 3 and 4.

Figure 3:
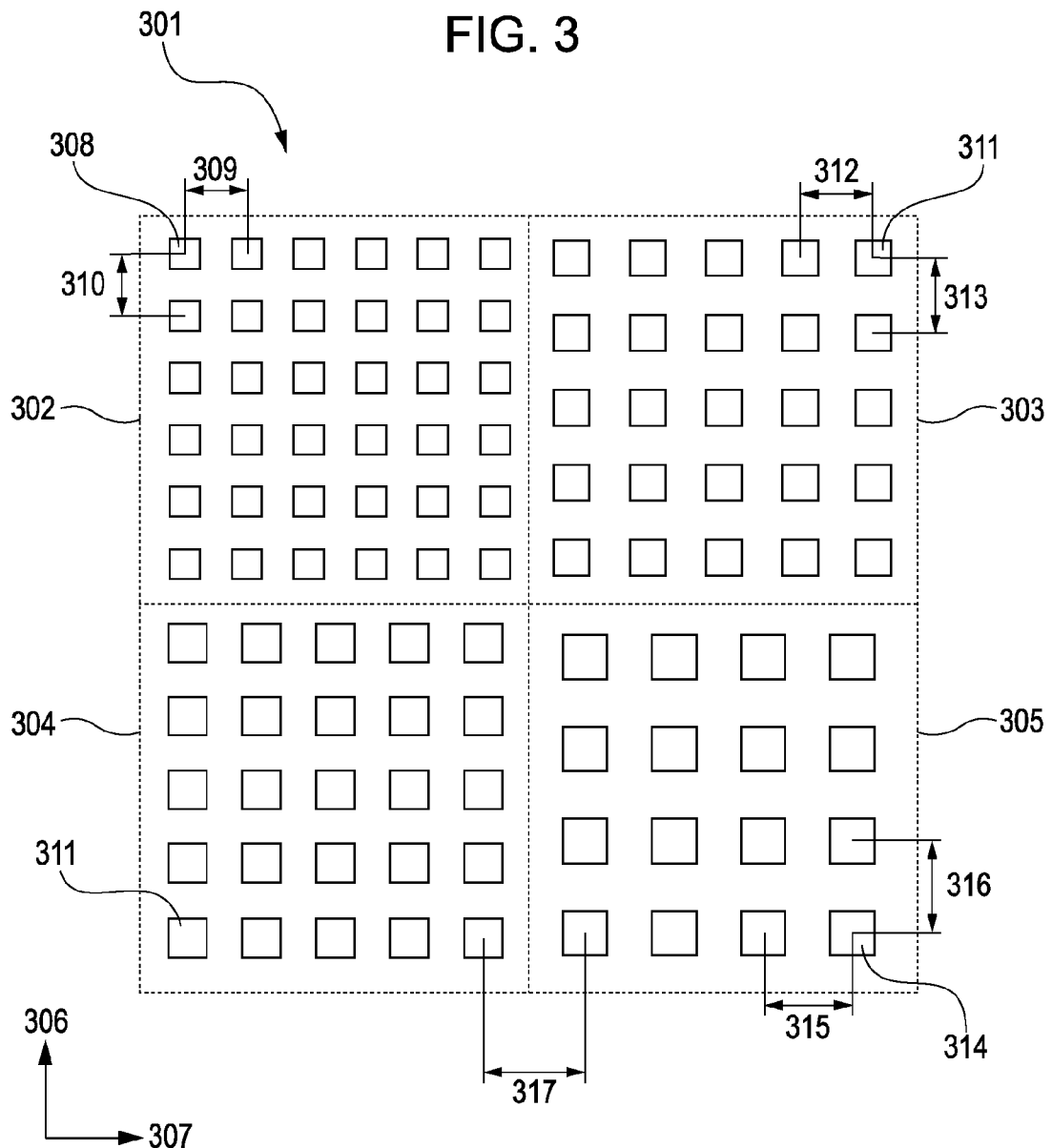
FIG. 3 is a schematic view showing an optical element including optical filters having different arrangement periods.

FIG. 3 is a schematic view showing an optical element 301 including three types of optical filters 302, 303, 304, and 305 arranged into a Bayer pattern. The optical filters 303 and 304 are constituted by metal structures of the same shape and size periodically arranged at the same distance; thus, when the optical filters 303 and 304 are used separately, their transmission spectra are identical.

The optical filter 302 includes metal structures 308. The optical filters 303 and 304 include metal structures 311. The optical filter 305 includes metal structures 314.

The metal structures 308, 311, and 314 respectively have 90 nm, 120 nm, and 150 nm square shapes and all have a thickness of 90 nm. The metal structures 308 are arranged into a square grid and the distance 309 between the metal structures 308 in a direction 307 and the distance 310 between the metal structures 308 in a direction 306 are 250 nm each (250 nm period). The metal structures 311 are arranged into a square grid and the distance 312 between the metal structures 311 in the direction 307 and the distance 313 between the metal structures 311 in the direction 306 are 300 nm each (300 nm period). The metal structures 314 are arranged into a square grid and the distance 315 between the metal structures 314 in the direction 307 and the distance 316 between the metal structures 314 in the direction 306 are 380 nm each (380 nm period).

A center-to-center distance 317 between metal structures at the border between the optical filters 304 and 305 is 340 nm in the direction 307. This distance is different from the distances between the metal structures in the optical filters 304 and 305.

Then a numerical calculation for the optical element 301 is carried out by assuming that optical filters are arranged into a square grid with the optical filters 302, 303, 304, and 305 constituting one structural unit.

Figure 4:
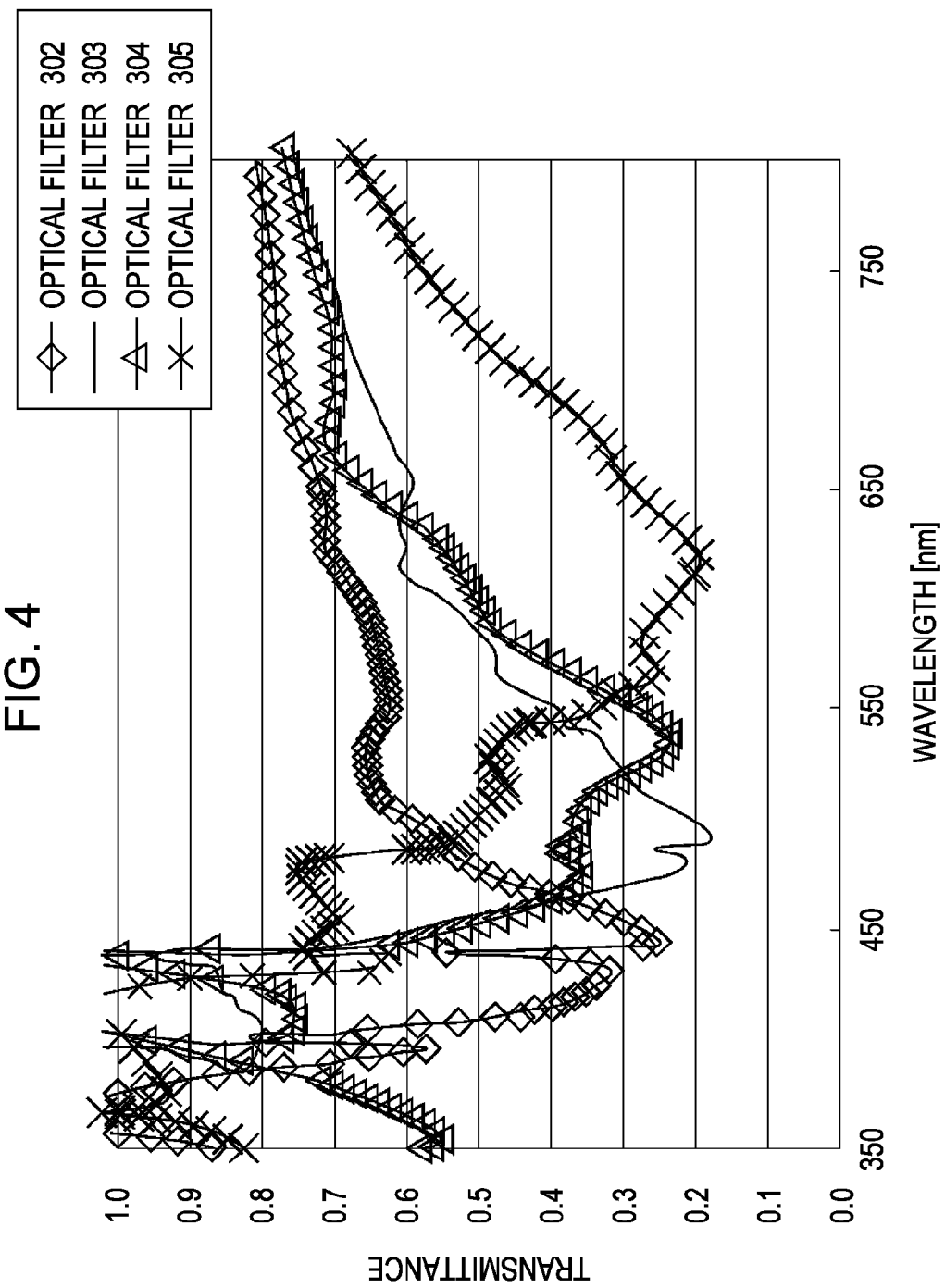
FIG. 4 is a graph showing a transmission spectrum of the optical filter shown in FIG. 3.

FIG. 4 is a graph showing the results of calculation of the transmission spectrum of the optical element 301 obtained as such. The graphs shows that the peak profiles of the transmission spectra of the optical filters 302, 303, 305, and 305 are not smooth and that some peaks are split. Moreover, the peaks are relatively wide and shallow. The positions and profiles of the peaks of the transmission spectra of the optical filters 303 and 304 differ, although the metal structures therein have the same size and are periodically arranged at the same distance.

The inventors believe that there are several factors that give the transmission spectra described above.

The first factor is the difference in plasmon resonance conditions between the central portion and the peripheral portion (i.e., the border region between adjacent optical filters) of the optical filter. When different types of optical filters (here, metal-structure groups having different center-to-center distances between adjacent metal structures) are arranged, metal structures in the peripheral portion of an optical filter are arranged to be adjacent to a metal-structure group constituted by metal structures arranged at a different center-to-center distance. As a result, the plasmon resonance condition differs between the central portion and the peripheral portion of the optical filter. Then a shift of resonance phases occurs and the degree of resonance decreases.

It is presumed that the peak in the transmission spectrum becomes shallow as a result, i.e., the transmittance drop may become moderate and the resulting color filter may exhibit a low contrast.

When different types of optical filters are arranged to be adjacent to each other, the plasmon resonance conditions in the peripheral portions may differ and the peak positions in the transmission spectra may also differ.

A next factor is the diffraction dependent on the optical distances of the periodically arranged metal-structure groups in the optical filters.

When optical filters having different optical distances are adjacent to each other, the borders between the optical filters appear clearly. When the size of the optical filters is the same, the period of arranging the optical filters can be defined and diffractions derived from such a period occur.

Presumably, this results in splitting of peaks and non-smooth peak profiles.

In other words, the above-described phenomena will occur and a desired spectrum profile is not readily achieved if an optical element is constituted by merely arranging optical filters that have been independently optimized. Further improvements are desired in order for these filters to be applicable to color filters for image sensors, etc.

The inventors of the present invention have conducted extensive research with the above-mentioned points in mind and have made the present invention.

Figure 5:
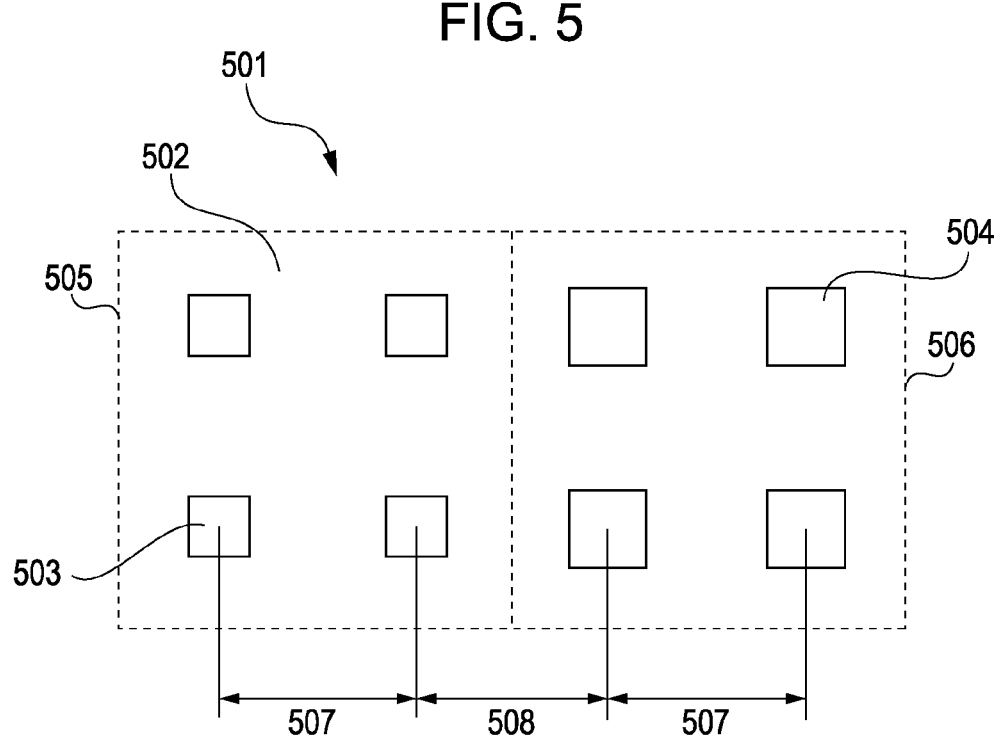
FIG. 5 is a schematic view showing the structure of an optical element of the present invention.

FIG. 5 is a top view (schematic view) showing an optical element 501 of the present invention.

The optical element 501 includes a substrate 502, first metal structures 503 (constitute a first metal-structure group) arranged in the in-plane direction of the surface of the substrate 502, and second metal structures 504 (constitute a second metal-structure group). Two metal-structure groups are arranged on the substrate.

The first metal structures 503 constituting an optical filter 505 are periodically arranged by being equally spaced from each other by an optical distance 507. The second metal structures 504 constituting an optical filter 506 are also periodically arranged by being equally spaced from each other by the optical distance 507.

As such, when the optical distance of the metal-structure group is adjusted to be the same between the optical filters constituting an optical element and the optical filters are periodically arranged, the difference in plasmon resonance conditions between the central portion and the peripheral portion of the optical filter becomes smaller.

In addition, when a center-to-center distance 508 between the metal structures at the border between the optical filters 505 and 506 is made equal to the optical distance 507 of the metal-structure groups of the optical filters 505 and 506, the border between the optical filters is no longer clear.

Accordingly, diffraction caused by the periods of the optical filters does not readily occur and a design that suppresses the adverse effect of placing optical filters of different characteristics next to each other is made possible.

Although an example of arranging two types of optical filters is described here, three or more optical filters may be combined. For example, an optical element including third metal structures in addition can be designed while suppressing the adverse effects from the adjacent optical filters.

Next, the optical distances of the metal-structure groups and the phase of the plasmon resonance according to the present invention are described. In order to sharpen peaks of transmission spectra of optical filters, the phases of the plasmon resonance of the respective metal structures in the optical filters can be matched.

The plasmon-resonance phases match if the optical distances of the metal-structure groups are the same. However, if the distances are not the same, the plasmon-resonance phases do not match.

With respect to the metal structures within an optical filter, when the optical distance of the metal-structure group shifts by ½ the optical distance, the plasmon-resonance phase becomes reversed and the phases cancel each other. Accordingly, the transmitted light from near that metal structure remain unaffected by the plasmon resonance. As a result, the peak of the transmission spectrum becomes shallow.

When different optical filters lie adjacent to each other and the optical distance of the metal-structure group of the optical filter shifts by ½ the optical distance, the plasmon-resonance phase becomes reversed and the phases cancel each other. Accordingly, the transmitted light fromnear that metal structure remain unaffected by the plasmon resonance. In particular, the metal structures in a border region between the optical filters are under a plasmon resonance condition different from that at the central portion of the optical filter. Accordingly, a plasmon-resonance phase shift occurs even within one optical filter. Shifting of the plasmon-resonance phase can be suppressed if the shift in the optical distance of the metal-structure group (optical distance between adjacent metal structures) is suppressed to ¼ or less of the optical distance, i.e., plus-minus 25% or less of the optical distance, among the optical filters.

In other words, when using first and second optical filters having characteristics different from each other, the optical distance of a second metal-structure group constituting the second filter should be adjusted to 0.75 to 1.25 times the optical distance of a first metal-structure group constituting the first filter.

This means that the optical distance between the adjacent first metal structures should be adjusted to 0.75 to 1.25 times the optical distance between the adjacent second metal structures.

In the present invention, the optical distance between adjacent metal structures in each optical filter is most preferably the same. However, advantageous effects may be obtained as long as the shift in the optical distance between the metal structures of the respective metal-structure groups is plus-minus 25% or less. The shift is more preferably plus-minus 10% or less since the shifting of plasmon-resonance phases can be further suppressed.

When the optical distance of the metal-structure group differs between optical filters, the border between the optical filters becomes clear and diffractions caused by the periodical arrangement of the optical filters occur.

In order to suppress such a phenomenon, it is effective to moderate the changes in plasmon resonance conditions in border regions between adjacent optical filters. In other words, it is effective to adjust the optical distance of the metal-structure group in the peripheral portion of the optical filter so that the optical distance is brought close to the optical distance of the adjacent optical filter stepwise, or to adjust the size of the metal structures in the peripheral portion of the optical filter so that the size is brought close to the size of the metal structures of the adjacent optical filter stepwise.

The present invention focuses on the optical distance of the metal-structure group of each optical filter. There is an aspect that the plasmon-resonance phases of the adjacent filters can be matched by making the optical distances uniform.

In the present invention, the center-to-center distance between a first metal structure and a second metal structure lying in a border region between the first optical filter and the second optical filter may be adjusted to 0.75 to 1.25 times the optical distance of the first or second metal-structure group.

The relationship between the angle of incidence (incident angle) and the optical distance of the periodically arranged metal-structure group of an optical filter will now be described.

Figure 15:
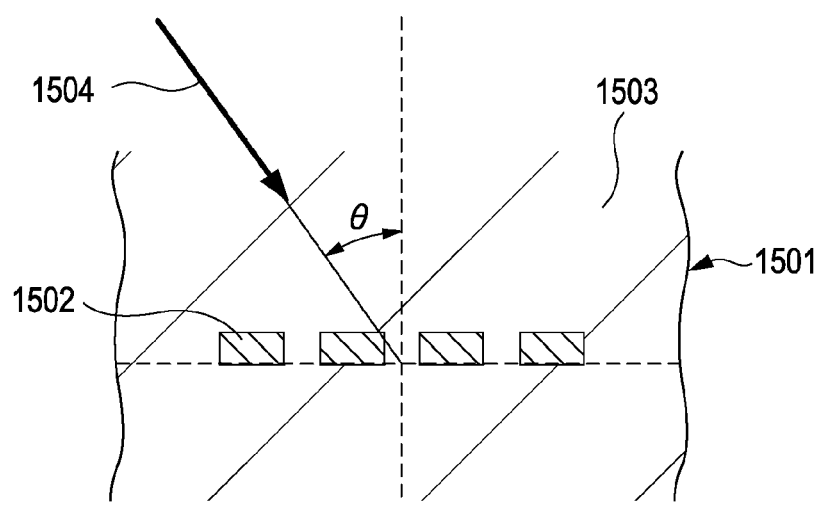
FIG. 15 is a schematic view illustrating an incident angle with respect to an optical filter.

FIG. 15 is a cross-sectional view showing an optical filter 1501 including metal structures 1502 covered with a homogeneous medium 1503.

Each metal structure 1502 has a shape of a 70 nm square and a thickness of 20 nm. The metal structures 1502 are two-dimensionally arranged at a period of 250 nm. Given that the refractive index of the homogeneous medium 1503 is 1.46, the optical distance of the periodically arranged metal-structure group is 365 nm.

Figure 16:
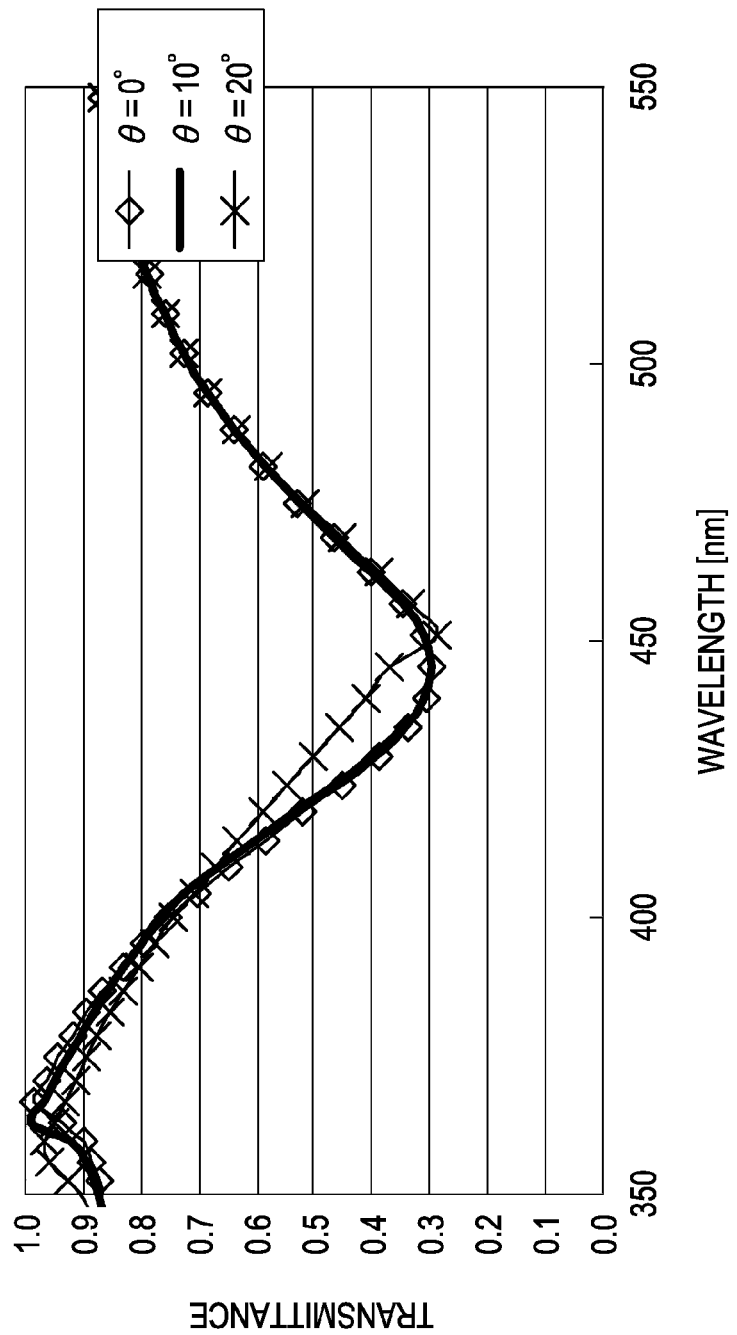
FIG. 16 is a graph showing a transmission spectrum of an optical filter having a dependency on the incident angle.

FIG. 16 is a graph showing the numerical calculation results of a transmission spectrum when light is obliquely incident on the optical filter 1501. In the numerical calculation, as shown in FIG. 15, the angle with respect to the normal to the surface on which the metal-structure group is arranged is used as the incident angle theta. The graph shows that when the incident angle is 0 degree or 10 degrees, the profile of the transmission spectrum remains substantially unchanged but when the incident angle is 20 degrees, the profile changes. Depending on the mode of use, it is possible the optical filter cannot sufficiently function as an optical filter when the incident angle is 20 degrees.

The change in the transmission spectrum profile is presumably attributable to Wood's anomalies. Wood's anomalies are phenomena in which incident light is diffracted by a periodic structure such as metal structures and propagates in the direction in which the periodic structures are arranged. When Wood's anomalies are coupled with plasmon resonance, the transmittance drop becomes moderate.

The wavelength at which Wood's anomalies occur depends upon the incident angle and the period (optical distance) of the periodic structure. When the period of the periodic structure is constant and the incident angle is increased, the wavelength at which the Wood's anomalies occur becomes longer. Thus, the dependency of the optical filter on the incident angle can be reduced by preventing the Wood's anomalies from influencing the wavelength band used in the optical filter.

Suppose that an optical element of the present invention is an optical element that corresponds to a visible light region and includes a plurality of optical filters having different characteristics. Then, all optical filters may be designed by preventing the blue optical filter involving the shortest wavelength band from being affected by the Wood's anomalies. In other words, setting should be adjusted so that the wavelength at which the Wood's anomalies occur is 400 nm or less. Preferably, the transmission spectrum characteristic remains unchanged in the range of the incidence angle plus-minus 20 degrees.

Figure 17:
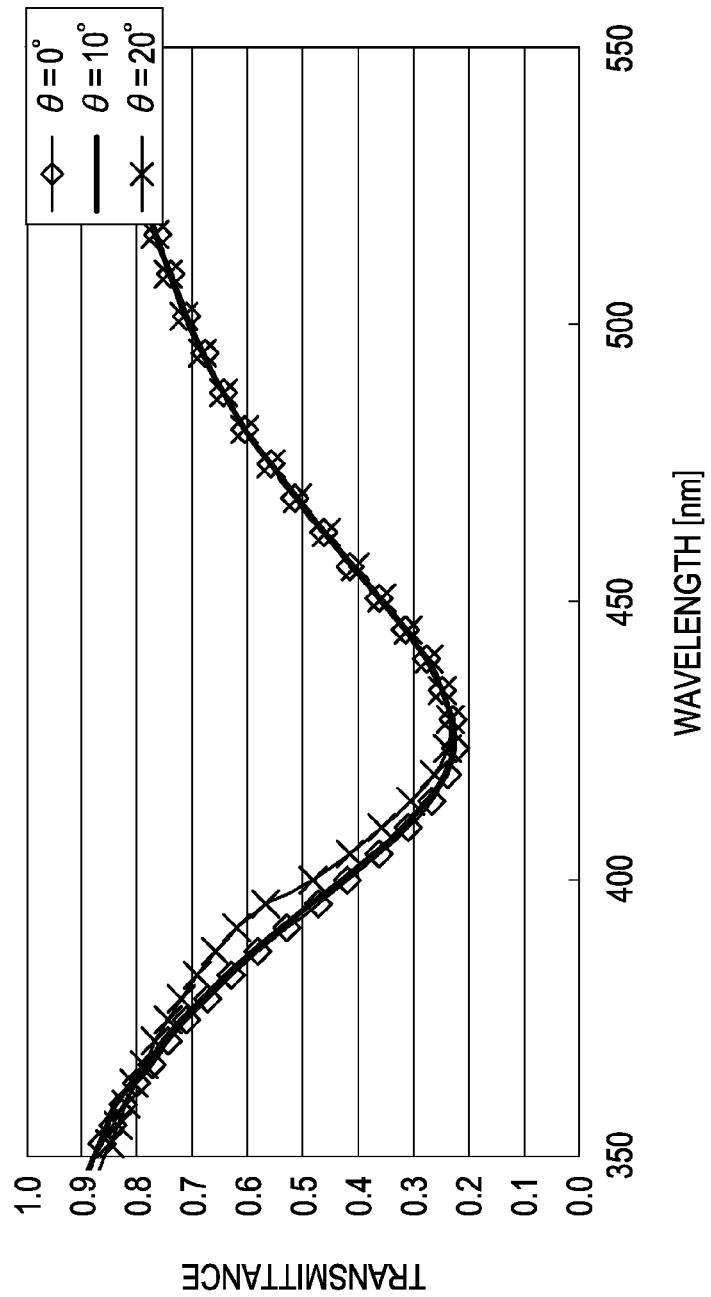
FIG. 17 is a graph showing a transmission spectrum of an optical filter of the present invention.

FIG. 17 is a graph showing the numerical calculation results of a transmission spectrum when the period of arranging the metal-structure group in the optical filter shown in FIG. 15 is reduced to 220 nm.

The graph shows that the profile of the transmission spectrum remains substantially unchanged when the incident angle is in the range of 0 to 20 degrees at a wavelength of 400 nm or more. Moreover, only when the incident angle is 20 degrees, a rapid change in transmittance presumably attributable to Wood's anomalies occurs at a wavelength of 390 nm to 400 nm.

This shows that the period at which the metal-structure group is arranged may be 220 nm or less. The metal-structure group in such a case is covered with a medium having a refractive index of 1.46 and thus the optical distance is about 325 nm.

In sum, when the cover layer (dielectric layer) covering the metal structures is composed of $SiO_2$ (glass), the optical distance of the metal-structure group may be 325 nm or less in the present invention.

Although the description heretofore involves the optical distance that corresponds to the entire visible light region, in the case where the optical element does not need a blue optical filter, the wavelength that can avoid the influence of the Wood's anomalies becomes longer and thus the optical distance increases.

Individual components constituting the optical element of the present invention will now be described in detail.

[Substrate]

Any substrate that has a flat surface on which metal structures can be formed may be used as a substrate. The substrate may have a high transmittance in the visible light region.

Examples of the material having a high transmittance include silica, quartz, polymethyl methacrylate (PMMA), polystyrene, amorphous fluorocarbon resins, indium tin oxide (ITO), and silicon nitride.

[Cover Layer]

When metal structures are to be arranged in the in-plane direction of the surface of the substrate of the present invention, the plasmon-exciting wavelength occurring at the interfaces between the substrate and the metal structures may differ from the plasmon-exciting wavelength occurring at the surfaces of the metal structures other than the interfaces in some cases. Such a phenomenon occurs when the refractive index of the material in contact with the metal structures is different from that of the metal structures. This may lead to widening of the peak width and splitting of peaks in the transmission spectrum. Such a problem may be avoided by covering the metal structures on the substrate surface with a material having a refractive index close to that of the substrate.

The material for the cover layer of the present invention may be a material that has a high transmittance in the visible light region as with the substrate. Examples thereof include silica, quartz, PMMA, polystyrene, amorphous fluorocarbon resins, ITO, and silicon nitride.

[Metal Structures]

The metal constituting the metal structures of the present invention may be a metal that exhibits plasmon resonance. Examples of such a metal include gold, silver, copper, aluminum, platinum, zinc, an alloy containing at least two of these elements, and an alloy containing at least one of these elements. Among these, aluminum has a plasma frequency higher than that of silver and facilitates the design of an optical filter that has an optical characteristic that covers the entire visible region.

Examples of the shape of the metal structures include non-multifaceted shapes such as spherical and substantially spherical shapes and various multifaceted shapes such as partly removed spherical and substantially spherical shapes, a columnar shape, a prismatic shape, a conical shape, a pyramid shape, a cubical shape, a rectangular parallelepiped shape, a ring shape having a thickness, a shape of a number sign (#) having a thickness, and a shape of a square with a cross inside, the square and the cross having a thickness. Metal particles may also be used as the metal structures and may have any shape as long as the effects of the present invention can be achieved. The metal particles need not be spherical and may be multifaceted. An adhesive layer may be provided between the substrate and the metal structures in making the optical element.

Figure 6A:
FIGS. 6A to 6E are schematic views illustrating shapes of metal structures of the present invention.
Figure 6B:
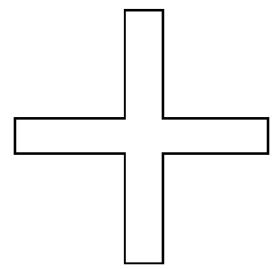
Figure 6C:
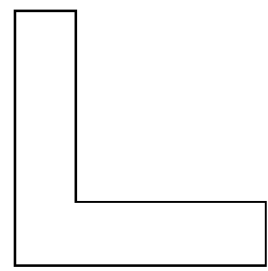
Figure 6D:
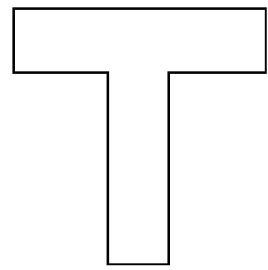
Figure 6E:
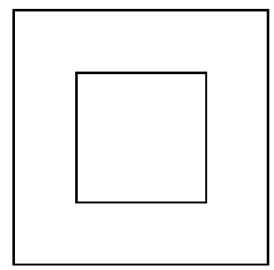

From the viewpoint of the peak width of the transmission spectrum, the metal structures may include a fine shape such as any one of the shapes shown in FIGS. 6A to 6E, i.e., a rectangular shape (FIG. 6A), a cross shape (FIG. 6B), an L shape (FIG. 6C), a T shape (FIG. 6D), and a box shape (FIG. 6E).

When the size increases in the in-plane direction of the substrate, the peak width of the transmission spectrum increases. This is presumably associated with the fact that regions where the incident light cannot enter the interior of the metal structures are generated as the size of the metal structures becomes larger with respect to the vibration plane of the incident light. When the size of the metal structures increases, the region where the incident light cannot enter becomes larger. When this occurs, the dielectric constant of the metal structures approaches the dielectric constant of the region where the incident light cannot enter. In other words, the dielectric constant approaches the dielectric constant of the bulk metal.

When the metal structures have fine structures with respect to the vibration plane of the incident light, the region where the incident light cannot enter becomes smaller. Thus, the effective dielectric constant approaches that of the surrounding material rather than that of the bulk metal. The substrate and the cover layer used in the present invention do not absorb incident light in the visible light region; therefore, the peak width of the transmission spectrum is small.

For the reasons given above, the metal structures may have fine structures.

From the viewpoint of ease of making the metal structures, the thickness of the metal structures may be uniform in the in-plane direction of the substrate.

[Arrangement of Metal Structures]

Figure 7A:
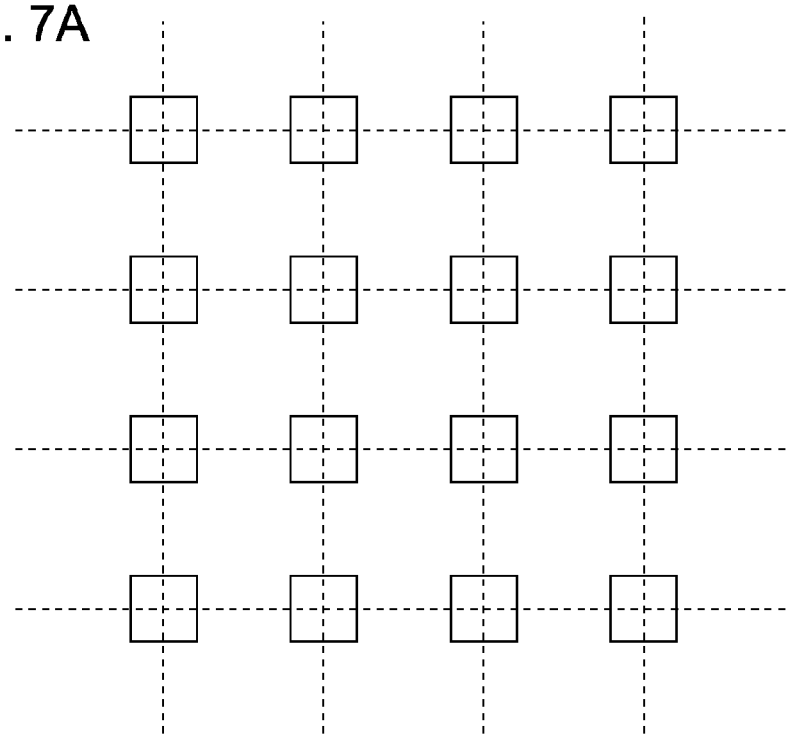
FIGS. 7A and 7B are schematic views illustrating arrangements of metal structures of the present invention.
Figure 7B:
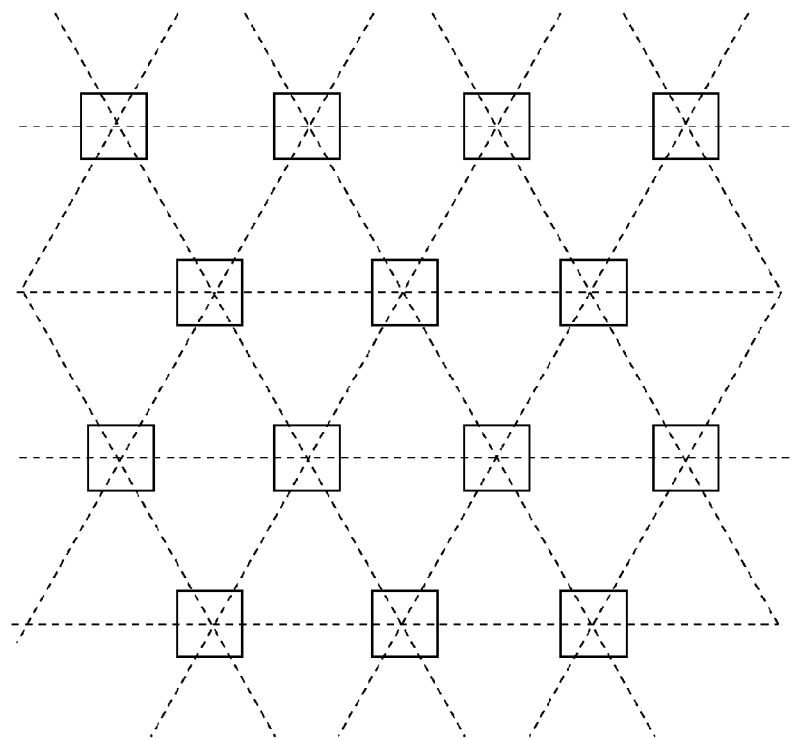

The arrangement of the metal structures may be any as long as metal structures of a desired shape are arranged periodically in the same direction in the in-plane direction of the substrate surface at the same arrangement period. For example, as shown in FIGS. 7A and 7B, the metal structures may be arranged in a square grid pattern (FIG. 7A) or a triangular grid pattern (FIG. 7B).

[Arrangement of Optical Filters]

Examples of the arrangement of optical filters constituting the optical element of the present invention are shown in FIGS. 8A to 8D.

Figure 8A:
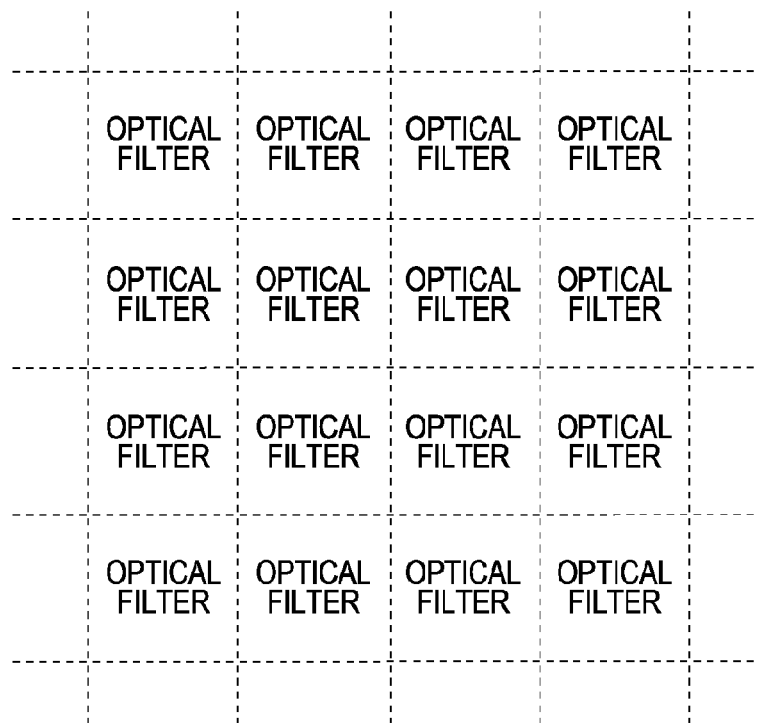
FIGS. 8A to 8D are schematic views illustrating arrangements of optical filters of the present invention.
Figure 8B:
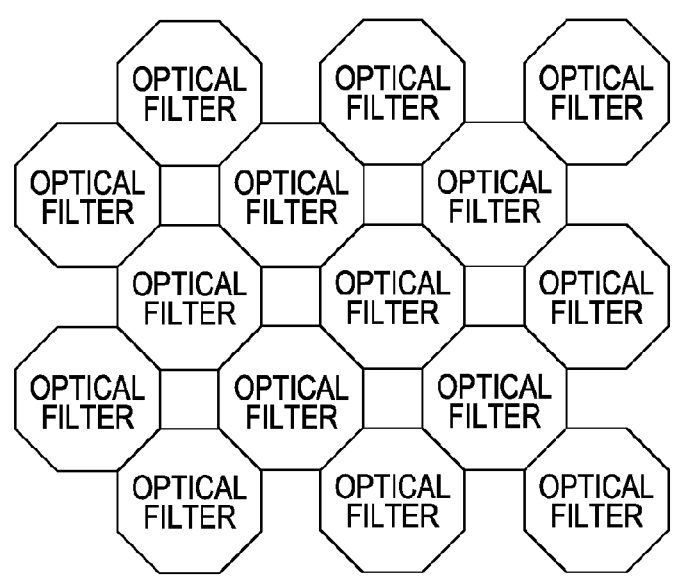
Figure 8C:
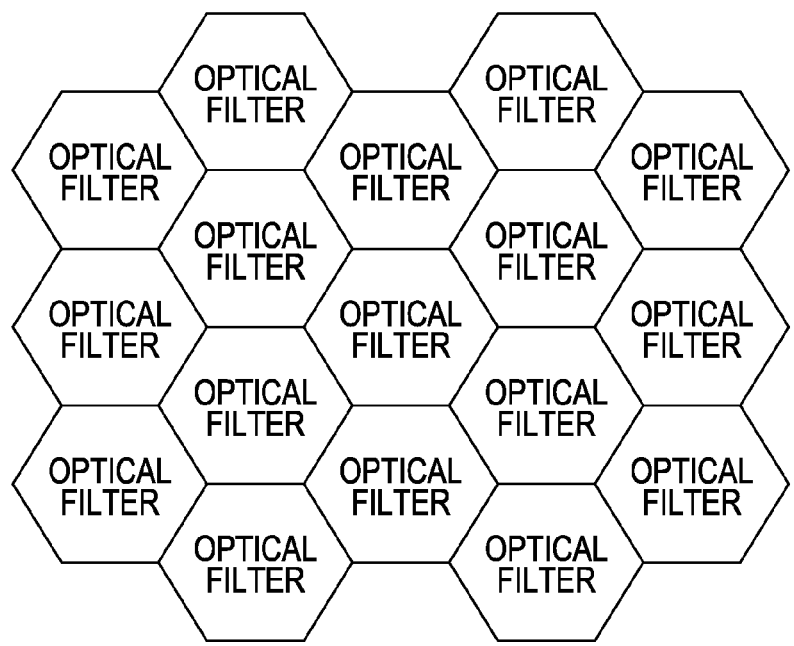
Figure 8D:
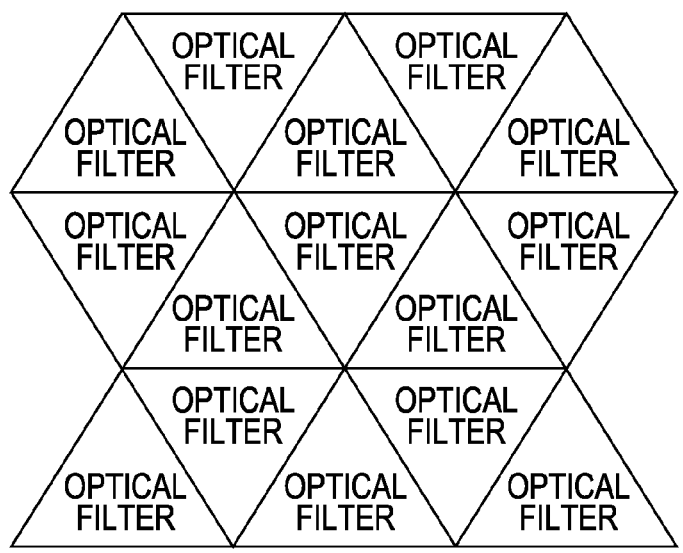

FIG. 8A shows a Bayer pattern which is most commonly used for color filters. FIG. 8B shows a honeycomb pattern, FIG. 8C shows a hexagonal grid pattern, and FIG. 8D shows a triangular grid pattern designed to increase the density of the area occupied by the color filters.

The regions occupied by the optical filters may overlap one another as long as the arrangement period of the metal structures can be maintained.

If the period of arranging the metal structures is the same in the in-plane direction of the substrate surface, the effects of the present invention can be obtained by any combination of the arrangement of the metal structures and the arrangement of the optical filters.

Next, an image sensor (an image sensor that detects light according to a spectrum characteristic) to which the present invention is applied is described.

Figure 9:
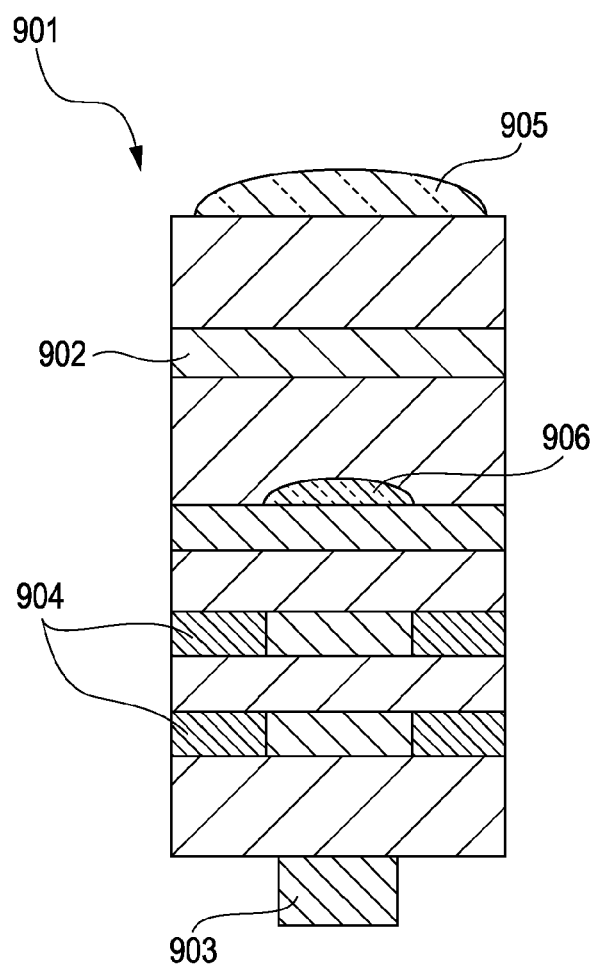
FIG. 9 is a schematic view showing the structure of an image sensor of the present invention.

FIG. 9 is a schematic view showing the structure of an image sensor to which the present invention is applied. One pixel is illustrated in the drawing. The actual image sensor includes a plurality of pixels but adjacent pixels are not illustrated in the drawing.

The image sensor of the present invention includes an optical element that selectively transmits light according to the wavelength and a photoelectric conversion layer which light that has been transmitted through the optical element enters. An image sensor 901 shown in FIG. 9 further includes a microlens 905 for collecting light from outside, an inner lens 906 for collecting light inside the image sensor, and wirings 904 for transferring charges generated in a photoelectric conversion layer 903. Note that the image sensor of the present invention uses the optical elements of the present invention and one optical filter of the optical element of the present invention is provided to one pixel.

The incident light from outside is condensed through the microlens 905 and passes through an optical element 902. The optical element 902 transmits light of a particular wavelength band. The transmitted light is condensed with the inner lens 906 in the pixel of the image sensor so that the light does not scatter to the wirings 904 but enters the photoelectric conversion layer 903. As the light enters, charges are generated in the photoelectric conversion layer 903 and signals are transferred via the wirings 904.

Next, an image pickup apparatus of the present invention is described.

Figure 10:
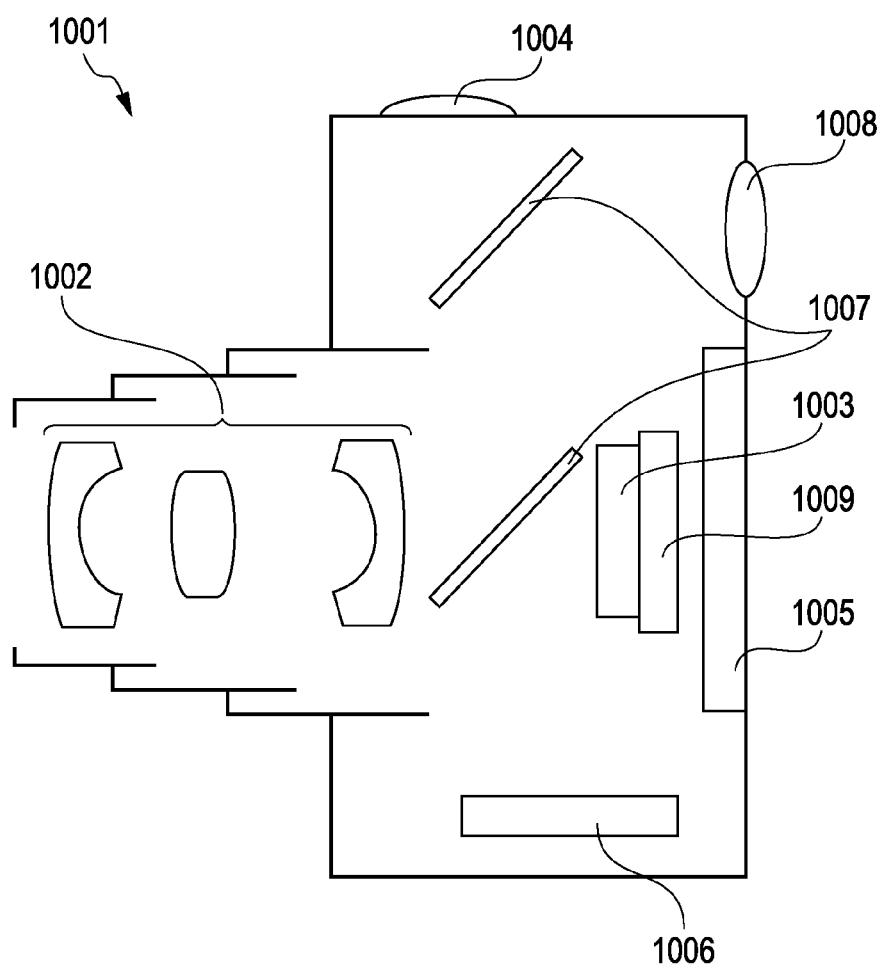
FIG. 10 is a schematic view showing the structure of an image pickup apparatus of the present invention.

FIG. 10 is a schematic view showing the structure of an image pickup apparatus of the present invention.

An image pickup apparatus of the present invention includes an image sensor, a condenser optical system for collecting light from outside and focusing the light on the image sensor, and a signal processing device for processing electrical signals converted by a photoelectrical conversion layer of the image sensor.

An image pickup apparatus 1001 shown in FIG. 10 includes a shutter 1004 for determining the timing of shooting, a display 1005 configured to display image information to be captured, and a recording unit 1006 that records the captured image information.

The light from the image to be shot is focused on an image sensor 1003 by adjusting the focal distance of a condenser optical system 1002. A mirror 1007 and an eyepiece 1008 may be provided to visually confirm whether the image is formed or not. Whether the image is formed or not can also be confirmed by constantly displaying image information in the display 1005. The light formed into an image by depression of the shutter 1004 is converted into electrical signals by the photoelectrical conversion layer (not shown) of the image sensor 1003. A signal processing device 1009 converts the image information into digital signals or corrects the image information to improve the appearance. The image information can be recorded on the recording unit 1006 or on a recording medium (not shown) which can be carried outside.

The present invention will now be described by using specific examples. It should be understood that the technical scope of the present invention is not limited by the examples below and includes various modifications and alterations made on the basis of the technical concept disclosed in the Claims.

EXAMPLES

Example 1

In this example, square-shaped metal structures are arranged into a square grid pattern and optical filters are arranged into a Bayer pattern. The results of numerical calculation are described with reference to FIGS. 11A, 11B, and 12.

[Optical Element of Example 1]

Figure 11A:
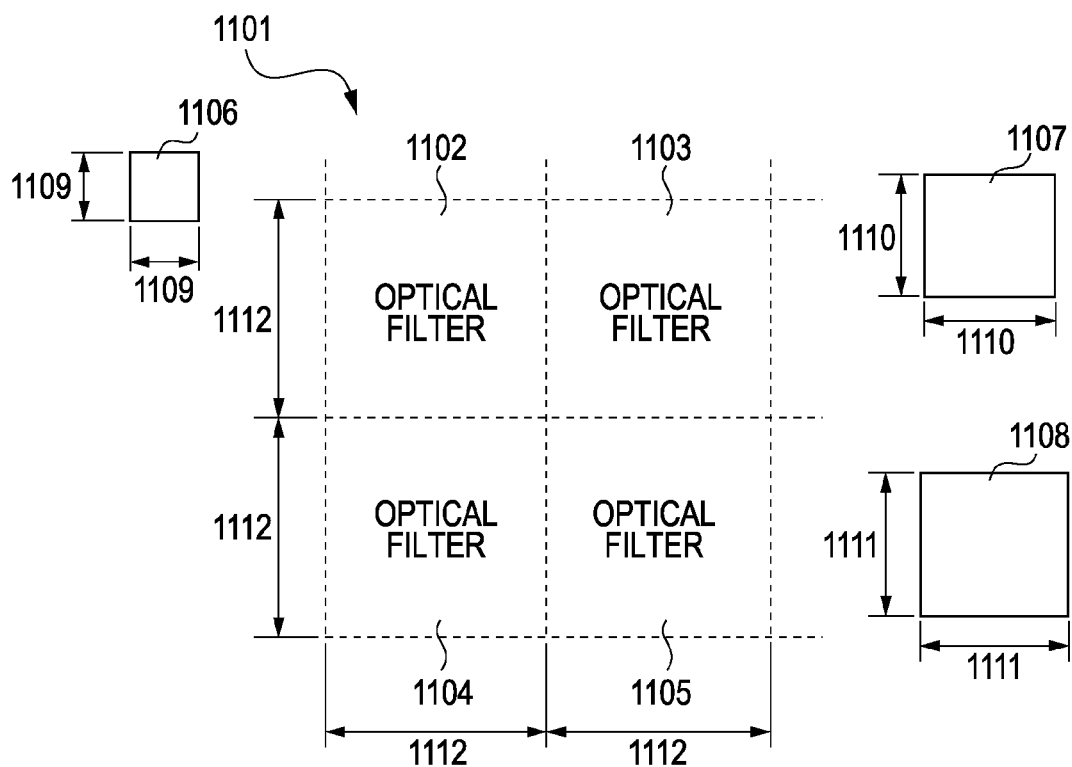
FIGS. 11A and 11B are schematic views of an optical element of Example 1.
Figure 11B:
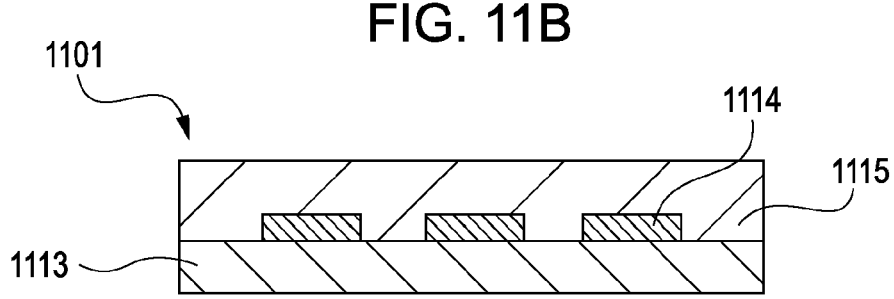

FIGS. 11A and 11B are schematic views showing the structure of an optical element of this example. An optical element 1101 includes three types of optical filters 1102, 1103, 1104, and 1105 arranged into a Bayer pattern. The optical filters 1103 and 1104 have the same structure.

FIG. 11A is a schematic view showing a part of the optical element. A plurality of regions shown in FIG. 11A are periodically arranged into a square grid pattern and the numerical calculation is conducted on such an optical element.

The structure and size of the metal structures disposed in the optical filters 1102, 1103, 1104, and 1105 are as follows. The metal used in the metal structures is aluminum.

Metal structures 1106 of the optical filter 1102:
Size 1109 of one side: 90 nm
Thickness: 40 nm
Arrangement period: 220 nm
Metal structures 1107 of the optical filters 1103 and 1104:
Size 1110 of one side: 130 nm
Thickness: 20 nm
Arrangement period: 220 nm
Metal structures 1108 of the optical filter 1105
Size 1111 of one side: 150 nm
Thickness: 10 nm
Arrangement period: 220 nm A size 1112 of one side of each of the optical filters 1102, 1103, 1104, and 1105 is 1540 nm and all of the optical filters are square shaped.

Metal structures 1114 are disposed on a $SiO_2$ substrate 1113 and covered with a $SiO_2$ layer 1115 as shown in FIG. 11B.

[Calculation Results of Example 1]

Figure 12:
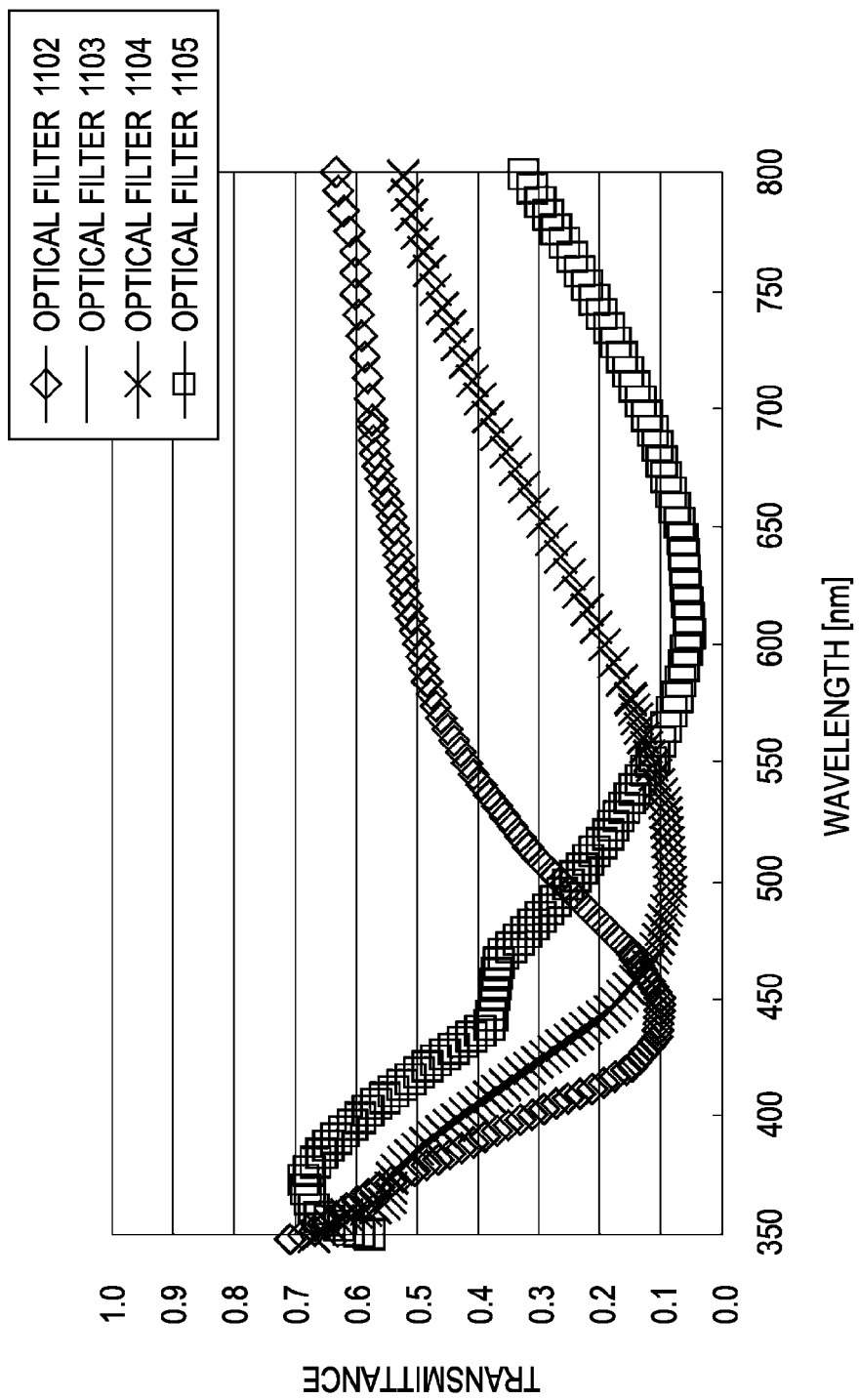
FIG. 12 is a graph showing a transmission spectrum of the optical element of Example 1.

FIG. 12 shows results of calculation for a transmission spectrum obtained by applying light to the optical element 1101 shown in FIGS. 11A and 11B in a direction perpendicular to the in-plane direction.

Smooth spectrum profiles are obtained since the period of arranging the metal structures is made uniform to 220 nm among the optical filters.

Example 2

The results of numerical calculation conducted in Example 1 show that the optical filter 1105 gives a smooth spectrum profile at the long wavelength side but its peak width is large. Possibly, the optical filter 1105 may not exhibit optimum color-filter characteristics depending on the usage.

In this example, the shape of the metal structures in the optical filters 1103, 1104, and 1105 used in Example 1 is changed to a cross shape so that the optical element has a more favorable peak width at the long wavelength side. The results of numerical calculation therefor are also described.

[Optical Element of Example 2]

Figure 13A:
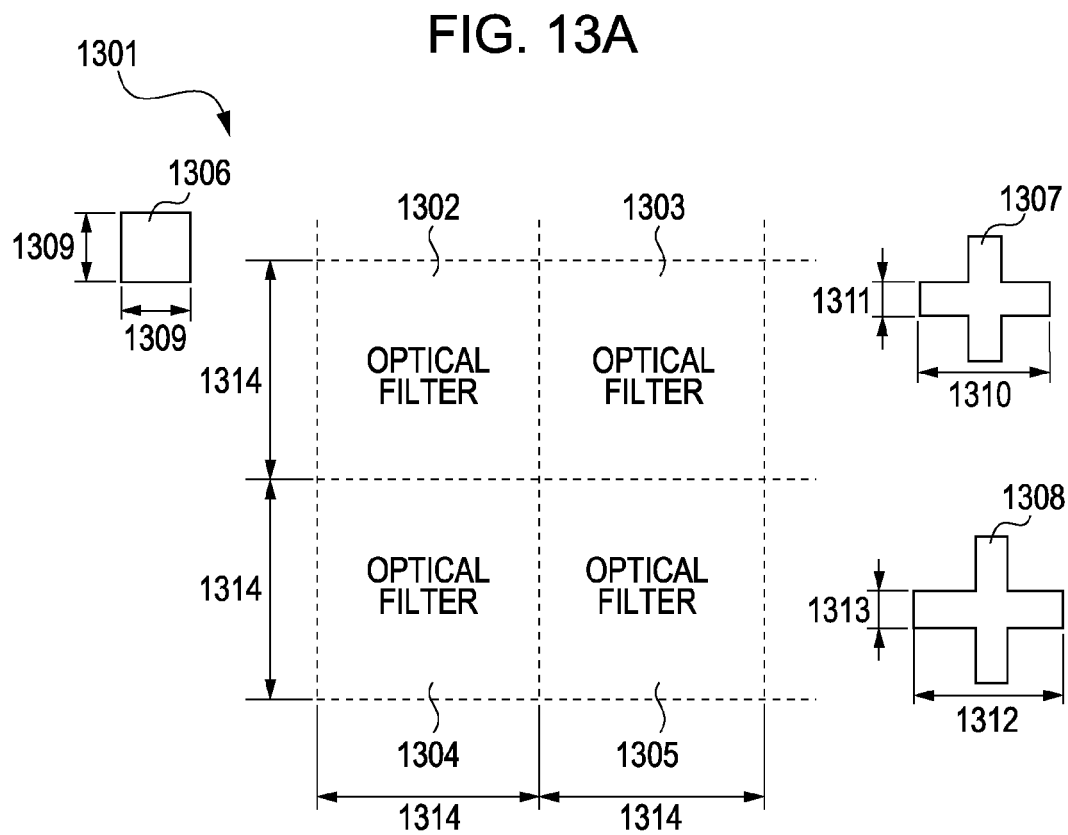
FIGS. 13A and 13B are schematic views of an optical element of Example 2.
Figure 13B:
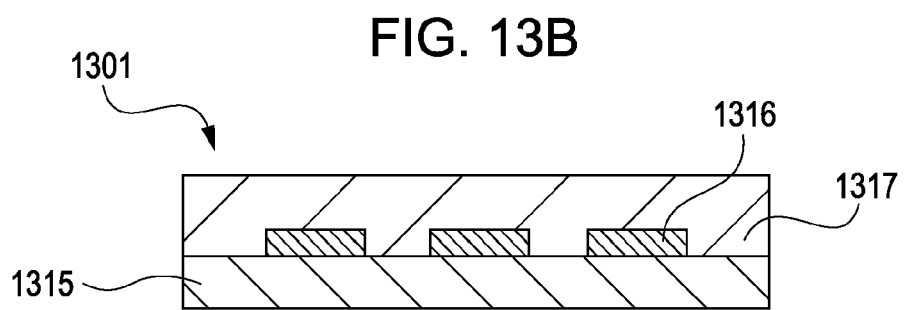

FIGS. 13A and 13B are schematic views showing the structure of an optical element of this example.

The structure and size of the metal structures of optical filters 1302, 1303, 1304, and 1305 of an optical element 1301 of this example are as follows.

Metal structures 1306 of the optical filter 1302:
Shape in the in-plane direction of the dielectric substrate surface: square
Size 1309 of one side: 90 nm
Thickness: 20 nm
Arrangement period: 200 nm
Metal structures 1307 of the optical filters 1303 and 1304:
Shape in the in-plane direction of the dielectric substrate surface: cross
Size 1310 in the long axis direction: 130 nm
Size 1311 in the short axis direction: 50 nm
Thickness: 20 nm
Arrangement period: 200 nm
Metal structures 1108 of the optical filter 1305:
Shape in the in-plane direction of the dielectric substrate surface: cross
Size 1312 in the long axis direction: 150 nm
Size 1313 in the short axis direction: 50 nm
Thickness: 20 nm
Arrangement period: 200 nm A size 1314 of one side of each of the optical filters 1302, 1303, 1304, and 1305 is 1400 nm and all of the optical filters are square shaped.

The structures other than those described above are the same as those in Example 1.

[Calculation Results of Example 2]

Figure 14:
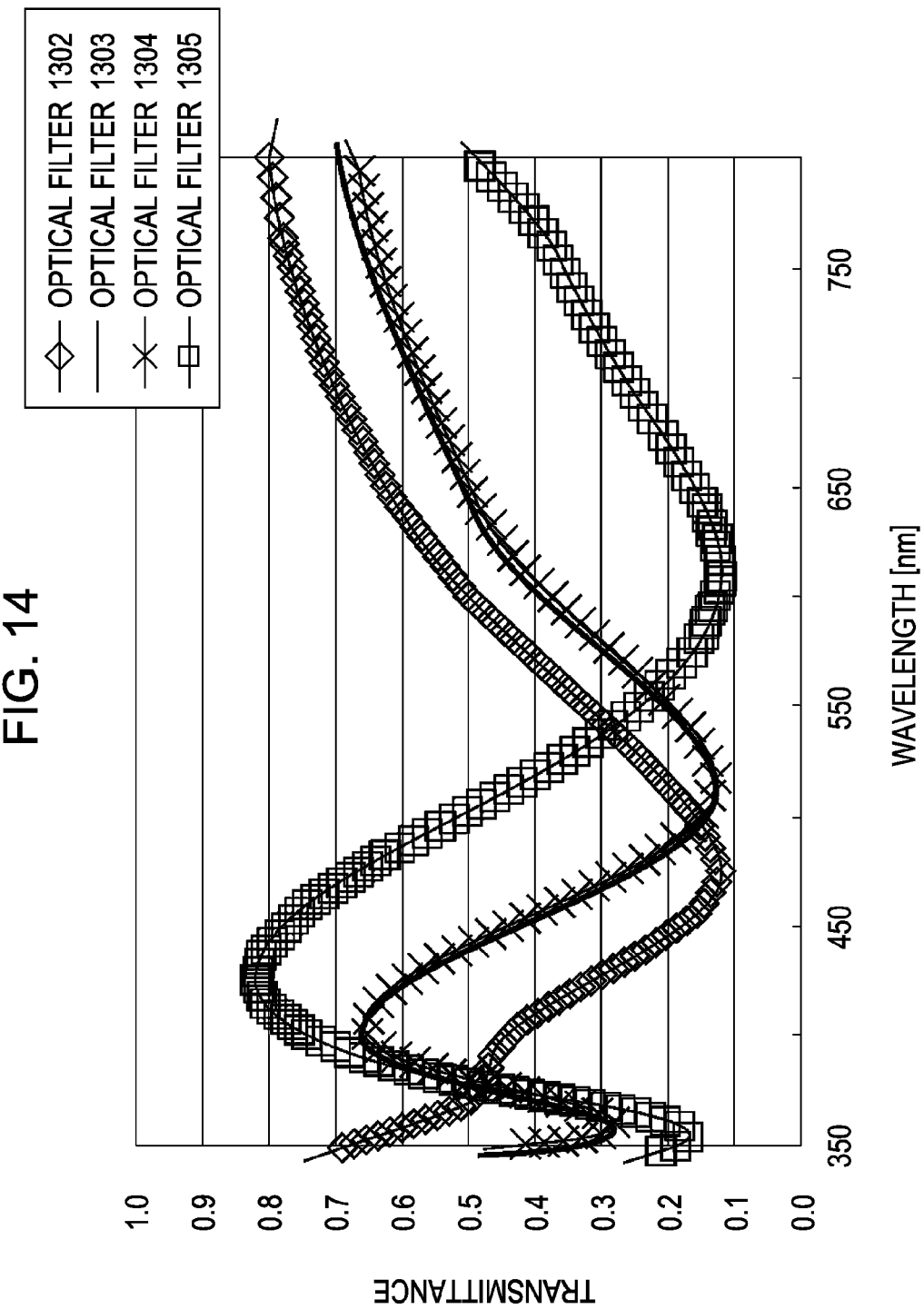
FIG. 14 is a graph showing a transmission spectrum of the optical element of Example 2.

FIG. 14 shows results of calculation for a transmission spectrum obtained by applying light to an optical element 1301 shown in FIGS. 13A and 13B in a direction perpendicular to the in-plane direction.

In this example also, smooth spectrum profiles are obtained by making the arrangement period of the metal structures uniform to 200 nm among the optical filters. Since the metal structures of the optical filters 1303, 1304, and 1305 have a shape of a cross, the peak width is decreased compared to when the metal structures are square shaped.

Since the thickness of the metal structures of the optical filters is made uniform, the number of steps required for production can be reduced.

According to the optical element of the present invention described above, the period of arranging the metal structures in the metal-structure groups constituting optical filters of different characteristics is made substantially uniform so that the transmission spectrum profiles are smooth and relatively sharp peak characteristics are exhibited.

Accordingly, an optical element that shows a high-contrast filtering effect for a particular wavelength region can be provided.

Moreover, the optical element of the present invention uses plasmon resonance and thin metal structures can be used to form the optical element. Thus, thin color filters, image sensors, image pickup apparatuses, and the like that are compatible with size reduction of pixels can be provided.

Example 3

In this example, results of numerical calculation of transmission spectra obtained by changing the angle of light incident on the optical filter 1302 of Example 2 from 0 degree to 20 degrees are described.

Given that the refractive index of $SiO_2$ is 1.46, the optical distance between adjacent metal structures of the metal-structure group of the optical filter 1302 is 321.2 nm, smaller than 325 nm. In other words, the dependency on the incident angle is anticipated to be small.

Figure 18:
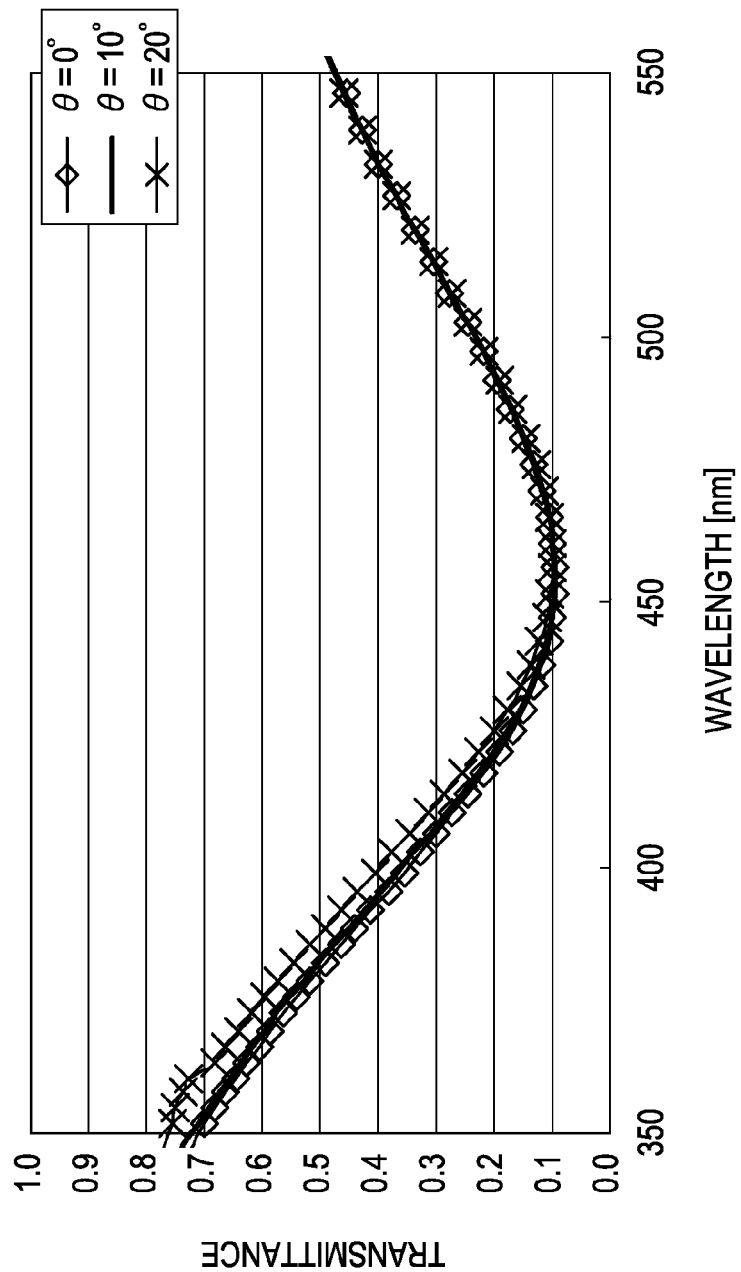
FIG. 18 is a graph showing a transmission spectrum of an optical filter of Example 3.

FIG. 18 is a graph showing the results of numerical calculation. As shown in the graph, the profile of the transmission spectrum remains substantially unchanged even when the incident angle is varied to 0, 10, and 20 degrees.

In this example, the dependency of the transmission spectrum on the incident angle can be reduced by setting the optical distance between the metal structures constituting the metal-structure group to 325 nm or less.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-333868, filed Dec. 26, 2008, which is hereby incorporated by reference herein in its entirety.

REFERENCE SIGNS LIST

101 Optical element
102 Metal structure
103 Substrate
104 Cover layer
105 Period of arranging metal structures
301 Optical element
302 Optical filter
303 Optical filter
304 Optical filter
305 Optical filter
308 Metal structures of optical filter 302
309 Period of arranging metal structures in direction 307 in optical filter 302
310 Period of arranging metal structures in direction 306 in optical filter 302
311 Metal structures of optical filters 303 and 304
312 Period of arranging metal structures in direction 307 in optical filters 303 and 304
313 Period of arranging metal structures in direction 306 in optical filters 303 and 304
314 Metal structures of optical filter 305
315 Period of arranging metal structures in direction 307 in optical filter 305
316 Period of arranging metal structures in direction 306 in optical filter 305
317 Center-to-center distance between metal structures at the border between optical filters 304 and 305
501 Optical element
502 Substrate
503 Metal structures of optical filter 505
504 Metal structures of optical filter 506
505 Optical filter
506 Optical filter
507 Period of arranging metal structures of optical filters 505 and 506
508 Center-to-center distance between metal structures at the border between optical filters 505 and 506
901 Image sensor
902 Optical element
903 Photoelectric conversion layer
904 Wiring
905 Microlens
906 Inner lens
Image pickup apparatus
1002 Condenser optical system
1003 Image sensor
1004 Shutter
1005 Display
1006 Recording unit
1007 Mirror
1008 Eyepiece lens
1009 Signal processing device
1101 Optical element
1102 Optical filter
1103 Optical filter
1104 Optical filter
1105 Optical filter
1106 Metal structure
1107 Metal structure
1108 Metal structure
1109 Size of metal structure 906
1110 Size of metal structure 907
1111 Size of metal structure 908
1112 Size of optical filter
1113 $SiO_2$ substrate
1114 Metal structure
1115 $SiO_2$ layer
1301 Optical element
1302 Optical filter
1303 Optical filter
1304 Optical filter
1305 Optical filter 1306 Metal structure
1307 Metal structure
1308 Metal structure
1309 Size of metal structure 1106
1310 Size of long axis of metal structure 1107
1311 Size of short axis of metal structure 1107
1312 Size of long axis of metal structure 1108
1313 Size of short axis of metal structure 1108
1314 Size of optical filter
1315 SiO$_2$ substrate
1316 Metal structure
1317 SiO$_2$ layer
1501 Optical filter
1502 Metal structure
1503 Homogeneous medium
1504 Incident light

The invention claimed is:

1. An optical filter for reducing a diffraction of light caused by the use of adjacent filters of different sized metal structures, the optical filter comprising:
a first optical filter including a first metal structure group including first metal structures periodically arranged in an in-plane direction of a substrate surface; and
a second optical filter including a second metal structure group including second metal structures that have a different size from that of the first metal structures, periodically arranged in the in-plane direction, the second metal structure group exhibiting a plasmon resonance condition different from that of the first metal structure group,
wherein the first optical filter and the second optical filter are adjacent to each other,
wherein a first optical distance between the first metal structures adjacent to each other is in a range of 0.75 to 1.25 times a second optical distance between the second metal structures adjacent to each other,
wherein the optical distance between the centers of one of the first metal structures and one of the second metal structures adjacent the one of the first metal structures is denoted as the border optical distance between the first and second optical filters,
wherein the first and second optical filters reduce the diffraction of light incident on the first and second optical filters by employing a border optical distance in a range of 0.75 to 1.25 times the second optical distance to increase a degree of matching of the plasmon resonance condition of the first and second optical filters in a border area of the first and second optical filters including the one of the first metal structures and the one of the second metal structures above a degree of matching of the plasmon resonance condition of the first and second optical filters when the border optical distance is outside the range of 0.75 to 1.25 times the second optical distance, and
wherein the first and the second optical filters individually select a certain wavelength region of a light utilizing the plasmon resonance.

2. The optical filter according to claim 1, wherein the first optical distance and the second optical distance are each in a range of 325 nm or less.

3. The optical filter according to claim 1, wherein the first and second metal structure groups have a square grid pattern or a triangular grid pattern.

4. The optical filter according to claim 1, wherein the first and second metal structures have a rectangular shape, a cross shape, an L shape, a T shape, or a box shape in the in-plane direction.

5. The optical filter according to claim 1, wherein the first and second metal structures are covered with a cover layer.

6. An image sensor comprising:
an optical filter according to claim 1; and
a photoelectric conversion element which light transmitted through the optical element enters.

7. An image pickup apparatus comprising:
a condenser optical system;
an image sensor according to claim 6; and
a signal processing device.

8. The optical filter according to claim 1, wherein the first optical distance is equal to the second optical distance.

9. The optical filter according to claim 8, wherein the border optical distance is equal to the second optical distance.

* * * * *